Aug. 8, 1961 G. KRAUS 2,994,934
QUICK COUPLING FOR SECURING STRAPS
Filed March 26, 1959 2 Sheets-Sheet 1
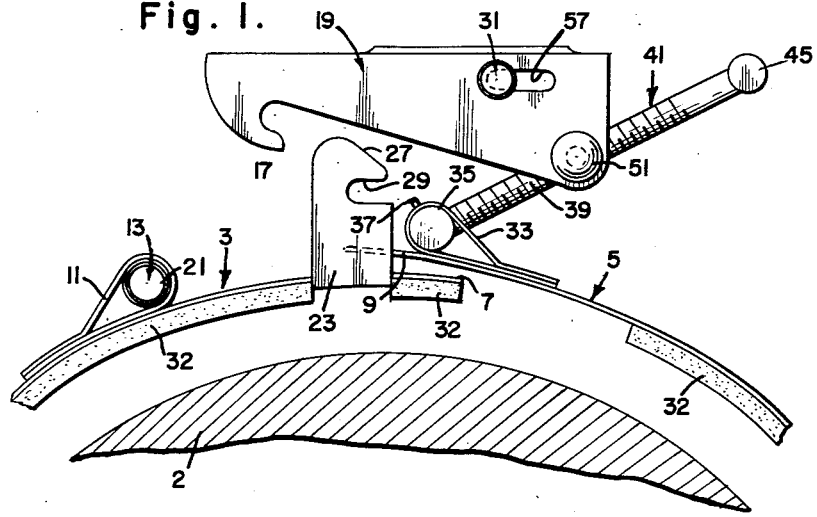
INVENTOR.
Gustav Kraus
BY
Townsend and Townsend
attorneys Aug. 8, 1961 G. KRAUS 2,994,934
QUICK COUPLING FOR SECURING STRAPS
Filed March 26, 1959 2 Sheets-Sheet 2
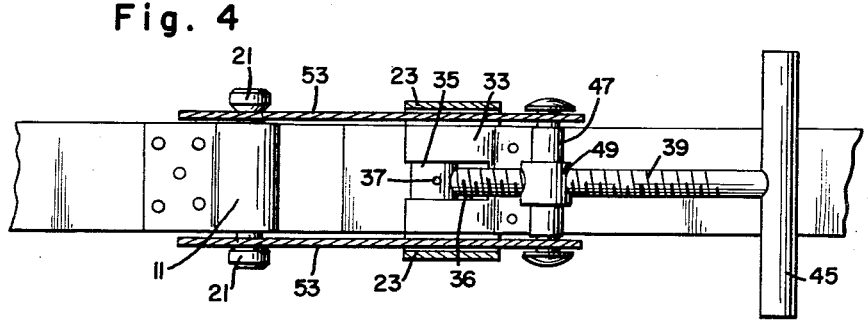
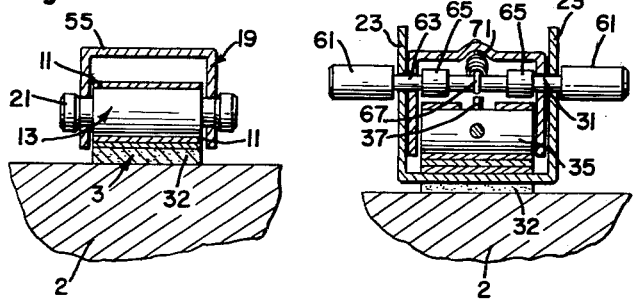
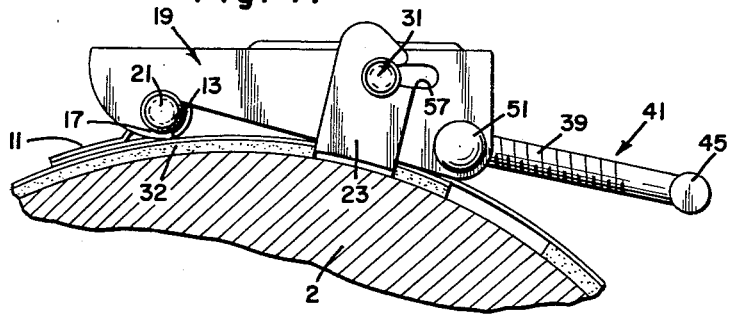
INVENTOR.
Gustav Kraus
BY
Townsend and Townsend
Attorneys Patented Aug. 8, 1961

2,994,934
QUICK COUPLING FOR SECURING STRAPS
Gustav Kraus, 30 Lucerne St., San Francisco, Calif.
Filed Mar. 26, 1959, Ser. No. 802,168
6 Claims. (Cl. 24—271)

This invention relates to improvements in quick couplings for securing straps. More particularly, the invention relates to toggle type coupling assemblies which may be quickly operated to join, positively lock, and adjustably draw together the meeting ends of said straps.

The terms "positively locking," "positive locking means" and "positive lock" as employed in the within application are intended to identify and describe a type of lock for use in toggle couplings which cannot be released by any means other than a positive manual actuation of the coupling device.

One of the problems inherent in couplings presently used to join securing straps is their lack of provision for suitable safety means to guard against accidental opening or loosening of the coupling. Generally, such couplings are actuated by a clamp handle which often springs loose when subjected to jolting and jarring during transportation. When the couple becomes loose the goods are permitted to shift, presenting a danger to handlers and transporters and often causing serious property damage. Another problem found to inhere in such couplings is that they require considerable dexterity to manipulate them with the efficiency and speed necessary in loading and unloading operations. Additionally, present couplings which seek to provide adjustable means for the securing strap are time-consuming in that additional tools, such as screw drivers and wrenches, are needed in order to effect the adjustment.

Accordingly, it is a primary object of the within invention to provide a coupling for securing straps which is equipped with a safety device to prevent the coupling from becoming released except by positive manual operation. This object is accomplished by providing a coupling assembly having a stationary forward lock pin adapted to engage a hooked forward portion of a movable coupling latch and also having a stationary lock bracket adapted to receive a safety lock pin carried by the coupling latch at a rearward position in the coupling latch. The safety lock pin so engages the lock bracket that movement of the clamp lever alone will not loosen the coupling.

Another primary object of the within invention is the automatic operation of the safety lock means which insures proper closing and locking of the coupling device. To accomplish this object, spring means is provided for the slidably mounted safety pin, urging it to a forward position in the slotted coupling latch. As the upper ends of the lock bracket are beveled, when the coupling latch is moved downward to closing position the outwardly extending shank of the safety pin engaging the beveled portion of the latch bracket is urged rearwardly against the spring to the open ended bracket slots into which it is positioned under spring tension.

It is another primary object of the within invention to provide a coupling which may be coupled and released more quickly than couplings of the past. Accordingly, the coupling latch is provided with an actuating lever adapted to move the coupling latch into forward latch engagement with the stationary latch pin and then downward, causing the automatic safety pin to engage and lock in the lock bracket. The actuating lever is further adapted to upward forward movement simultaneous with rearward manipulation of the safety pin to effect a quick release.

Still another object of the within invention is to provide a means for adjusting the strap while in joined and locked condition which will not impede the quickness of the coupling or uncoupling operation. This object is accomplished by providing the actuating lever with a threaded shank journaled in a toggle pin pivotally mounted to the securing strap adjacent one meeting end, which shank threadedly engages a swivel pin hingedly connected to the rearwardly portion of the coupling latch, and has a handle at its outer end. Thus, after the coupling latch has been closed or placed into coupling engagement, the handle of the actuating lever may be rotated laterally causing the swivel pin carrying the coupling latch to ride along the threaded shank of the actuating lever applying equal and opposite pressure to the meeting ends of the strap to selectively cinch or uncinch the strap.

Still another object of the within invention is to provide a coupling for a securing strap having the above described features which may be used by the military to hasten and facilitate the loading, transporting and unloading of supplies and equipment during time of war or other emergency.

Still another object of the within invention is to provide a coupling assembly for securing straps which can be easily manipulated at night-time or in storage areas where there is little or no light. As coupling is accomplished by the within invention by movement of one lever, and release by simple, simultaneous movement of two levers, this object is readily accomplished.

Other objects of the present invention will become apparent upon reading the following specifications and referring to the accompanying drawings in which similar characters of reference represent corresponding parts in each of the several views.

In the drawings:
FIG. 1 is a side elevational view of the within invention showing a securing strap with coupling assembly in open position.
FIG. 2 is a side elevational view of the within invention showing a securing strap with coupling assembly in closed position, and in partial section.
FIG. 3 is a top plan sectional view of the within invention showing a securing strap with coupling assembly in closed position.
FIG. 4 is a view of the within invention taken along line 4—4 of FIG. 2.
FIG. 5 is a view of the within invention taken along line 5—5 of FIG. 3.
FIG. 6 is a view of the within invention taken along line 6—6 of FIG. 3.
FIG. 7 is a side elevational view of the within invention showing the securing strap in coupled or closed position.

Referring more particularly to the drawings, a first portion of the securing strap is indicated generally at 3, and a second portion of such strap is indicated generally at 5. The strap portions 3 and 5 have ends 7 and 9 in juxtaposed relationship. The numeral 2 indicates the article to be secured.

Attached to the first strap portion 3 by spot welding or other suitable bonding means is a loop or housing 11. A forward lock pin 13 is transversely positioned within the loop 11 and projects outwardly from opposite ends of said loop 11 as seen in FIG. 3. The forward lock pin 13 has grooves 15 adapted to engage the hooked ends 17 of the coupling latch 19. At the outer ends of lock pin 13 are retaining knobs 21.

A lock bracket 23 is spaced apart from the forward lock pin 13 and connected to strap portion 3 proximate the end or tongue 7. The lock bracket comprises a transverse bottom portion bonded to the underside of strap portion 3, and includes two side members 25 which project upwardly on opposite sides of the strap 3 and terminate in beveled ends 27 adjacent slots 29. The slots 29 are adapted to receive and retain safety lock pin 31.

The first portion 3 and the second portion 5 of the securing strap are fitted with pads 32 of resilient friction material, preferably composed of hard rubber to function as backing for the strap and also to prevent the strap from damaging the objects which it secures.

Bonded proximate the end or tongue 9 of strap portion 5 is a second loop 33 within which toggle pin 35 is pivotally mounted. A stop 37 projects outwardly from the toggle pin 35, and functions to limit forward pivotal action of the toggle pin by abutting the forward margin of the longitudinal slot 36, (seen in FIG. 4) formed through the center of the loop 33 and extending along the curved portion of the loop. The threaded shank 39 of the actuating lever, generally indicated at 41, passes through the aperture formed in loop 33 and is journaled at its lower end 43 in an aperture formed in the center of the toggle pin 35. On the shank 39 between the toggle pin 35 and the lever handle 45 is a threadedly mounted swivel pin 47. The shank 39 of lever 41 passes through a supporting collar 49 and a threaded aperture formed through the center of swivel pin 47. The swivel pin 47 is hingedly connected to the coupling latch 19 proximate its rearward end by means of hinge pins 51 which pass loosely through apertures formed in the side frame members 53 of coupling latch 19, and fit snugly into sockets in opposite ends of the swivel pin 47.

Coupling latch 19 comprises the aforementioned two side frame members 53 which are identical in configuration and top frame member 55. The side frame members are suitably spaced apart and supported by the top frame member 55 which also functions to shield the mechanism housed within. Formed through frame members 53 is a pair of longitudinally extending apertures or slots 57 of equal dimension and axially aligned.

Extending through slots 57 and projecting outwardly therefrom is the loose fitting safety lock pin 31 better seen in FIG. 5. Lock pin 31 increases in cross section at a point removed from side frame members 53, to form release knobs 61 and a shaft portion 63 suitably dimensioned to engage lock bracket slots 29. The release knobs are provided as finger grips with which to actuate the lock pin in the uncoupling operation. Set collars 65 are mounted on the safety lock pin 31 substantially adjacent the inner surface of frame members 53 to limit transverse displacement of the lock pin 31.

Attached at its rearward end 67 near the center of the lock pin 31, and at its forward end to head screw 69 mounted to the top frame member 55, is a tension spring 71. The spring 71 resiliently urges the safety lock pin 31 to its forward position in slots 57. When the coupling is in closed position, the spring urges the lock pin 31 against the forward margin of slots 29 in the lock bracket 23.

The coupling securing strap (with the exception of the rubber padding) preferably is made of stainless steel to provide for a sturdy, durable and rustproof assembly. However, as is readily understood, the strap and associated mechanism may be fabricated from any suitable material, including plastics.

When the securing strap is desired primarily to secure objects having curved surfaces, it has been found that preforming the strap to a slight radius of curvature assists the securing operation. Since the strap is made from stainless stel and is highly flexible, such preforming will not restrict the use of the strap in any way.

Also, as is understood, the strap may comprise a continuous web of material having two joinable ends, or it may comprise separate joinable sections wherein the exterior end of each said section is adapted to attachment to stationary mounts between which goods to be secured are placed, and wherein the interior ends of the sections may be placed in juxtaposed relationship.

In operation, ends 7 and 9 are aligned as shown in FIG. 1 and the actuating lever is moved to forward position so that hooks 17 engage the forward lock pin 13. Lever 41 is then actuated in the rearward direction causing safety pin 31 to abut the beveled ends 27 of lock bracket 23, and causing rearward displacement of the safety pin 31 in its slots 57 against the tension of spring 71. The pin 31 is guided along the margin of the beveled edge to lock bracket slot 29 into which it flows under action of the spring and in which it retains a forward position. The handle 45 of lever 41 is then rotated transversely causing the swivel pin 47 to travel along the threaded shank 39 of lever 41 toward handle 45, thus drawing ends 7 and 9 together.

To uncouple the strap, a substantially reverse procedure is followed. Lever handle 45 is turned in the opposite direction loosening the strap. The safety pin 31 is pulled rearwardly out of engagement with lock slots 29 while upward forward pressure is applied to lever handle 45 disengaging hooks 17 with the forward lock pin 13. The entire uncoupling operation can be performed with one hand and with a minimum of dexterity.

Although the foregoing invention has been described in some detail by way of illustration and example for purposes of clarity of understanding, it is understood that certain changes and modifications may be practiced within the spirit of the invention and the scope of the appended claims.

What is claimed is:

1. A toggle latch assembly for a flexible securing strap having joinable first and second meeting end portions comprising a first connecting member including a loop pin mounted on said first end portion of said strap cooperable with a second connecting member carried by said second end portion of said strap for connecting said meeting end portions together; said second connecting member comprising a hook ended coupling; lock means comprising a spring mounted pin in said coupling extending outwardly from opposite sides thereof in slidable engagement therewith and a U-shaped bracket on said first end portion, said bracket including open ended lock slots to receive said lock pin therein and further including actuating means for said lock pin comprising cams at the ends of said bracket, and an adjustable member carried by said second end portion of said strap adapted to coact with said connecting members, said lock means, and said meeting end portions to open and close selectively said toggle latch assembly and to draw selectively said end portions together and apart while said latch assembly is closed.

2. A coupling securing strap having a toggle latch assembly according to claim 1 in which said strap comprises separate sections of flexible band material having two detachably joinable end portions.

3. A toggle latch assembly according to claim 1 in which said lock pin includes finger grips for unlocking said latch and wherein said actuating for selectively drawing said end portions together and apart includes a handle said handle and finger grips manually actuable together to open said toggle latch assembly in one operation.

4. A coupling for flexible securing straps having two meeting ends comprising: a coupling frame carried by a first strap end; a first pair of spaced apart latch members in said coupling frame; a second pair of spaced apart latch members on a second strap end releasably engageable with said first pair of latch members; actuating means for said coupling frame comprising a shaft connected to said frame intermediate its ends for arcuate pivotal movement relative to said frame in the direction of the longitudinal axis of the securing strap, the lower end of said shaft being journalled in said first strap end for rotatable movement in a direction substantially normal to the longitudinal axis of the securing strap; said shaft rotatably movable through said frame to securely cinch coupled strap ends together.

5. A coupling according to claim 4 and in which said first pair of latch members includes a spring biased lock pin and in which said second pair of latch members includes an open slotted bracket member cooperable with said lock pin to secure said coupling frame member in locked position when said actuating means is moved to coupling position.

6. A toggle latch assembly for a flexible securing strap having joinable first and second strap ends comprising a first latch member including a pin mounted on said first strap end cooperable with a second latch member carried by said second strap end to connect said meeting strap ends together; said second latch member comprising a hook-ended coupling; lock means including a spring mounted pin in said coupling extending outwardly from opposite sides thereof for slideable axial movement therewith; a U-shaped bracket on said first strap end spaced apart from said first latch means, said bracket including open-ended lock slots to receive said lock pin therein and further including cam means at the upper end thereof to position said lock pin in said slot during the coupling operation; a coupling actuating member rotatably affixed to said second strap end, said hook ended coupling including a hinge member receiving said actuating means therethrough and in threaded engagement therewith whereby said coupling is movable to and from coupling position by pivotal movement of said actuating means and whereby meeting strap ends when coupled may be selectively drawn together or apart by winding said actuating means through said coupling member.

References Cited in the file of this patent

UNITED STATES PATENTS

| | | |
|---|---|---|
| 1,646,463 | Stokesbery | Oct. 25, 1927 |
| 2,018,906 | Winter | Oct. 29, 1935 |
| 2,303,804 | Waid | Dec. 1, 1942 |
| 2,546,098 | Houghton et al. | Mar. 20, 1951 |
| 2,852,827 | Arnold | Sept. 23, 1958 |
| 2,869,211 | Kessler et al. | Jan. 20, 1959 |